United States Patent [19]

Baum et al.

[11] Patent Number: 4,928,239
[45] Date of Patent: May 22, 1990

[54] CACHE MEMORY WITH VARIABLE FETCH AND REPLACEMENT SCHEMES

[75] Inventors: Allen Baum, Palo Alto; William R. Bryg, Saratoga; Michael J. Mahon, San Jose; Ruby B. Lee, Cupertino; Steven S. Muchnick, San Francisco, all of Calif.

[73] Assignee: Hewlett-Packard Company, Palo Alto, Calif.

[21] Appl. No.: 358,460

[22] Filed: May 26, 1989

Related U.S. Application Data

[63] Continuation of Ser. No. 879,649, Jun. 27, 1986, abandoned.

[51] Int. Cl.[5] .................................................. G06F 9/32
[52] U.S. Cl. .................................. 364/200; 364/243.4; 364/254.8; 364/900; 364/964.2
[58] Field of Search ... 364/200 MS File, 900 MS File

[56] References Cited

U.S. PATENT DOCUMENTS

| | | | |
|---|---|---|---|
| 3,898,624 | 8/1975 | Tobias | 364/200 |
| 4,086,629 | 4/1978 | Desyllas et al. | 364/200 |
| 4,195,342 | 3/1980 | Joyce et al. | 364/200 |
| 4,197,580 | 4/1980 | Chang et al. | 364/200 |
| 4,229,789 | 10/1980 | Morgan et al. | 364/200 |
| 4,371,927 | 2/1983 | Wilhite et al. | 364/200 |
| 4,414,644 | 11/1983 | Tayler | 364/900 |
| 4,445,191 | 4/1984 | York | 364/900 |
| 4,533,995 | 8/1985 | Christian et al. | 364/200 |

Primary Examiner—Gary V. Harkcom
Assistant Examiner—Mark K. Zimmerman
Attorney, Agent, or Firm—Roland I. Griffin; Alan H. Haggard

[57] ABSTRACT

An instruction is presented to the cache; the instruction includes a cache control specifier which identifies a type of data being requested. Based on the cache control specifier, one of a plurality of replacement schemes is selected for swapping a data block out of the cache.

8 Claims, 3 Drawing Sheets

CACHE MEMORY WITH VARIABLE FETCH AND REPLACEMENT SCHEMES

CROSS REFERENCE TO RELATED APPLICATION

This application is a continuation of application Ser. No. 879,649, filed June 27, 1986, now abandoned.

This is a co-pending application having similar subject matter to application No. 750,810 filed on June 28, 1985. Applicant claims the benefit of this earlier filed co-pending application for claims in the present case which are drawn to the similar subject matter, as allowed under 37 CFR 1.78.

FIELD OF THE INVENTION

The present invention relates to computer systems and more particularly, to a computer system which utilizes a cache memory which can switch from a standard replacement scheme to a more efficient method of data replacement when warranted.

BACKGROUND OF THE INVENTION

Most modern computer systems include a central processing unit (CPU) and a main memory. The speed at which the CPU can decode and execute instructions to process data has for some time exceeded the speed at which instructions and operands can be transferred from main memory to the CPU. In an attempt to reduce the problems caused by this mismatch, many computer systems include a cache memory buffer between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than that located in main memory. Thus, a CPU with a cache memory needs to spend far less time waiting for instructions and operands to be fetched and/or stored. For example, in typical large, high-speed computers, main memory can be accessed in 300 to 600 nanoseconds; information can be obtained from a cache memory on the other hand, in 50 to 100 nanoseconds. For such machines, the cache memory produces a very substantial increase in execution speed, but processor performance is still limited in instruction execution rate by cache memory access time. Additional increases in instruction execution rate can be gained by further decreasing the cache memory access time.

A cache memory is made up of many blocks of one or more words of data. Each block has associated with it an address tag that uniquely identifies which block of main memory it is a copy of. Each time the processor makes a memory reference, the cache makes an address tag comparison to see if it has a copy of the requested data. If it does, it supplies the data. If it does not, it retrieves the block from main memory to replace one of the blocks stored in the cache, then supplies the data to the processor.

Optimizing the design of a cache memory generally has four aspects:

(1) Maximixing the probability of finding a memory reference's information in the cache (the so-called "hit" ratio), (2) minimizing the time required to access information that is indeed in the cache (access time), (3) minimizing the delay due to a cache "miss", and (4) minimizing the overhead of updating main memory and maintaining multicache consistency.

All of these objectives must be accomplished under cost constraints and in view of the interrelationship between the parameters, for example, the trade-off between "hit" ratio and access time.

It is obvious that the larger the cache memory, the higher the probability of finding the needed information in it. Cache sizes cannot be expanded without limit, however, for several reasons: cost, the most important reason in many machines, especially small ones; physical size, the cache must fit on the boards and in the cabinets; and access time, the larger the cache, the slower it will become.

Information is generally retrieved from cache associatively to determine if there is a "hit". However large associative memories are both very expensive and somewhat slow. In early cache memories, all the elements were searched associatively for each request by the CPU. In order to provide the access time required to keep up with the CPU, cache sizes was limited and the hit ratio was thus rather low.

More recently, cache memories have been organized into groups of smaller associative memories called sets. Each set contains a number of locations, referred to as the set size. For a cache of size m, divided into L sets, there are $s = m/L$ locations in each set. When an address in main memory is mapped into the cache, it can appear in any of the L sets. For a cache of a given size, searching each of the sets in parallel can improve access time by a factor of L. However, the time to complete the required associative search is still undesirably lengthy.

The operation of cache memories to date has been based upon the assumption that, because a particular memory location has been referenced, that location and locations very close to it are very likely to be accessed in the near future. This is often referred to as the property of locality. The property of locality has two aspects, temporal and spatial. While over short periods of time, a program distributes its memory references nonuniformly over its address space, the portions of the address space which are favored remain largely the same for long periods of time. This first property, called temporal locality, or locality by time, means that the information which will be in use in the near future is likely to be in use already. This type of behavior can be expected from certain data structures, such as program loops, in which both data and instructions are reused. The second property, locality by space, means that portions of the address space which are in use generally consist of a fairly small number of individually contiguous segments of that address space. Locality by space, then, means that the loci of reference of the program in the near future are likely to be near the current loci of reference. This type of behavior can be expected from common knowledge of program structure: related data items (variables, arrays) are usually stored together, and instruction are mostly executed sequentially. Since the cache memory retains segments of information that have been recently used, the property of locality implies that needed information is also likely to be found in the cache. See, Smith, A. J., Cache Memories, ACM Computing Surveys, 14:3 (Sept. 1982), pp. 473-530.

If a cache has more than one set, as described above, then when there is a cache miss, the cache must decide which of several blocks of information should be swapped out to make room for the new block being retrieved from main memory. To decide when block will be swapped out, different caches use different replacement schemes.

The most commonly utilized replacement scheme is Least Recently Used ("LRU"). According to the LRU replacement scheme, for each group of blocks at a particular index, the cache mantains several status bits that keep track of the order in which these blocks were last accessed. Each time one of the blocks is accessed, it is marked most recently used and the others are adjusted accordingly. When there is a cache miss, the block swapped out to make room for the block being retrieved from main memory is the block that was least recently used.

Other replacement schemes that are used are First In First Out (FIFO) and random replacement, the nonenclature being self-explanatory.

Contrary to the above-stated assumption, however, not all computer data structures have the same kind of data locality. For some simple structures such as data stacks or sequential data, an LRU replacement scheme is not optimal. Thus, in cache memory structures used in the past and in accordance with the basic assumption that the most likely data to be referenced is that which was referenced most recently or is close to that data in physical address, no provision has been made in cache memory operation for deviation from the standard data replacement scheme.

SUMMARY

It is an object of the present invention to minimize access time to a cache memory It is also an object of the invention to provide flexibility in cache memory operation so that the cache can switch from a standard replacement scheme to a mroe efficient method of data replacement when warranted.

These and other objects of the invention are accomplished by including a cache control specifier in each instruction that is presented to the cache memory. When presented with a store or load instruction, the cache identifies the cache control specifier in the instruction and implements one of a number of replacement schemes as indicated by the cache control specifier.

By embedding the cache control specifier in the instruction, the cache can treat stack or sequential data structures appropriately, thereby increasing cache performance. The cache can also receive "hints" as to when it is advantageous to prefetch data from main memory.

DETAILED DESCRIPTION OF THE INVENTION

Figure 1:
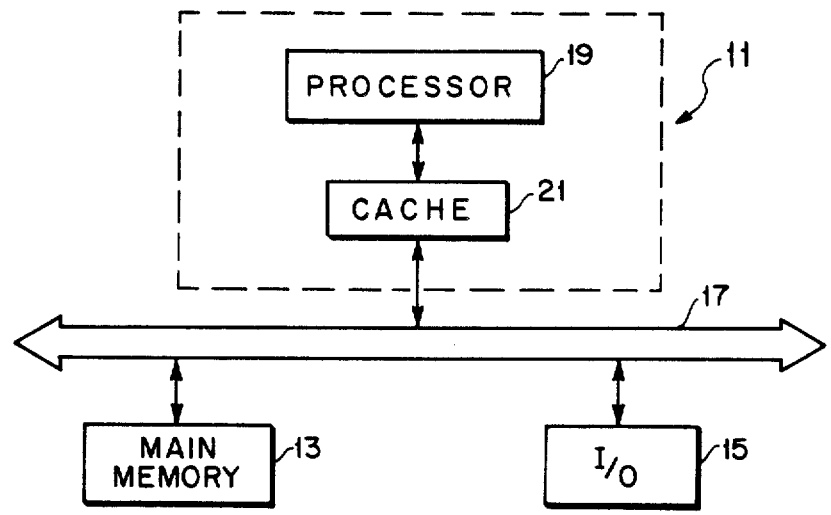
FIG. 1 is a schematic block diagram of a computer system which includes a cache memory.

FIG. 1 shows a computer system which incorporates a cache memory. A CPU 11 communicates with main memory 13 and input/output channel 15 via bus 17. The CPU includes a processor 19 which fetches, decodes and executes instructions to process data. Since, as discussed above, it is not practical to store all the instructions and data used by the computer system in CPU 11, data and instructions are stored in main memory 13, transferred to processor 19 when they are requested during the execution of a program or routine and returned to main memory 13 after the program or routine has been completed.

Access to main memory 13 is relatively slow compared with the operation of processor 19. If processor 19 had to wait for main memory access to be completed each time an instruction or data was needed, its execution rate would be significantly reduced. Therefore, in order to provide access times which more closely match the needs of the processor 19, a buffer memory, cache memory 21, stores a limited number of instructions and data.

Since cache memory 21 is much smaller than main memory 13, it can be economically built to have higher access rates. Nevertheless, there is still a trade-off between the access time for the cache and the size of the cache. As discussed above, as the cache becomes larger it becomes more expensive and the access time for the cache increases. Thus, if cache 21 is made very large to increase the hit ratio, although there will be very few references to main memory, the processor may be slowed down by increases access time, even for a cache "hit." It is therefore desirable to maximize the hit ratio for a cache of a given size and architecture.

Figure 2:
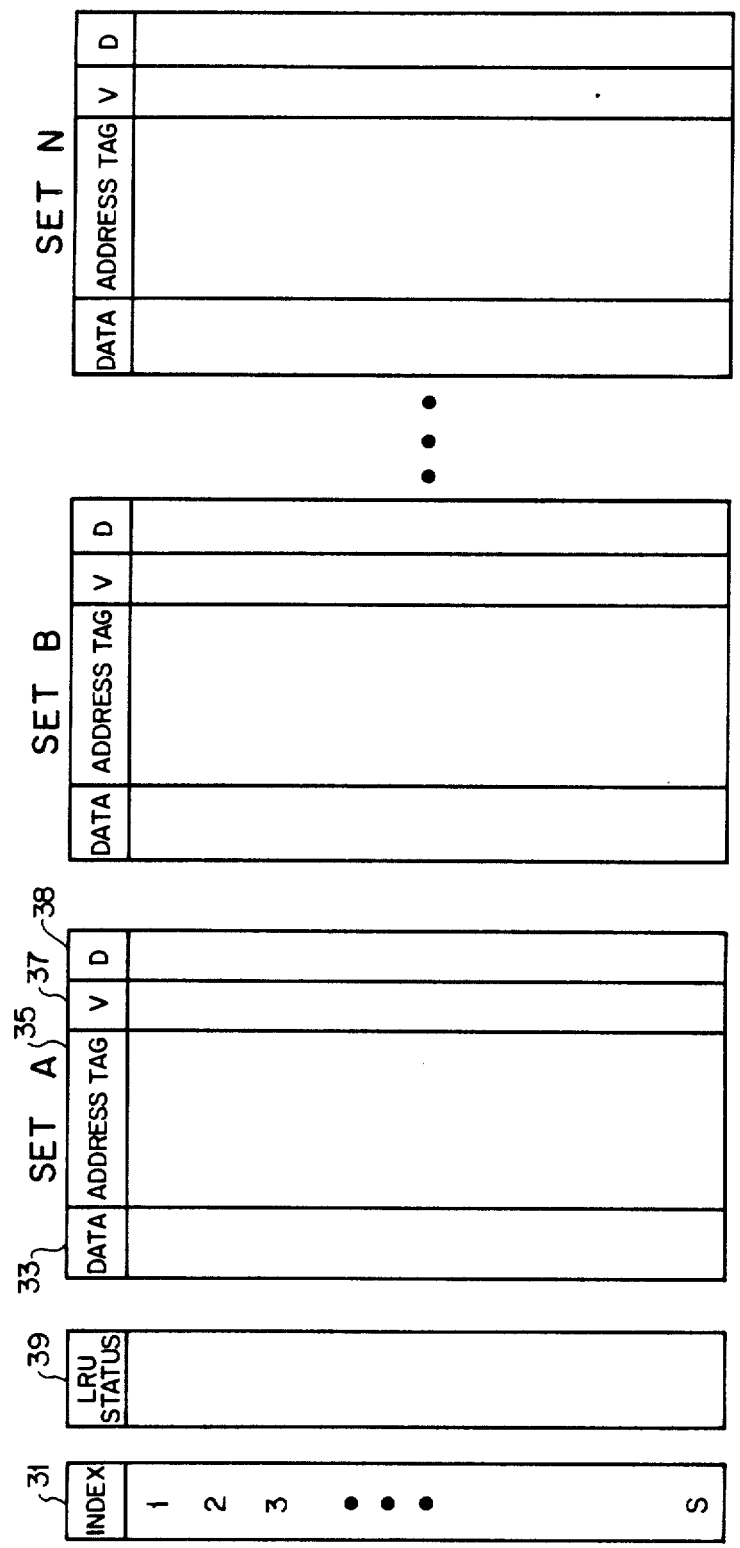
FIG. 2 is a schematic illustration of a multiple-set cache memory structure.

To explain the method of the invention more completely, an understanding of the structure of cache memory 21 is necessary. FIG. 2 shows a cache memory having multiple sets A-N. Each set comprises an array of locations or blocks which are labeled with an index 31. Each block contains data 33 and an address tag 35 which corresponds to the address of the copy of the same data in main memory 13. In the preferred embodiment, each block of data 33 contains four words. This four-word block is the unit in which data is exchanged between cache memory 21 and the main memory 13, and it is also the unit in which data is indexed, fetched and replaced in cache 21. The block could contain fewer or more words. These parameters are a matter of design choice for the memory system, and the principles of the invention can be applied to a wide range of possible configurations. In addition to the data 33 and address tag 35, each block in the cache has associated with it two one-bit status flags: "valid" and "dirty". The cache also has a group of LRU status bits for all blocks in the cache corresponding to the same index.

The valid bit 37 is set if and only if that block contains "valid", i.e., up-to-data, data.

The dirty bit 38 is set if the processor 19 has stored to that address in the cache memory since it was brought into the cache. Unless the cache 21 updates main memory 13 every time processor 19 does a stored to the cache, the cache will have more up-to-date data for a block than main memory has for the same block address. The dirty bit 38 indicates that main memory 13 must be updated by writing the data currently in the block in cache 21 back into main memory when that block is swapped out of the cache.

The LRU status bits 39 identify whether a block is the least recently used or most eligible for replacement. As stated above, according to the LRU replacement scheme, each time one of the blocks in the cache is accessed, it is marked most recently used and the LRU status bits of the others are adjusted accordingly.

Each time processor 19 makes a memory reference, cache 21 is searched to see if it contains a copy of the requested data. If it does not, then the data must be fetched in a block from main memory 13, supplied to processor 19 and stored in cache 21 replacing one of the blocks already there. If the replaced block is "dirty" that is, processor 19 has stored the block in the cache 21, then it must be written back to the appropriate address in main memory 13 to update main memory, thereby maintaining data integrity.

Figure 3:
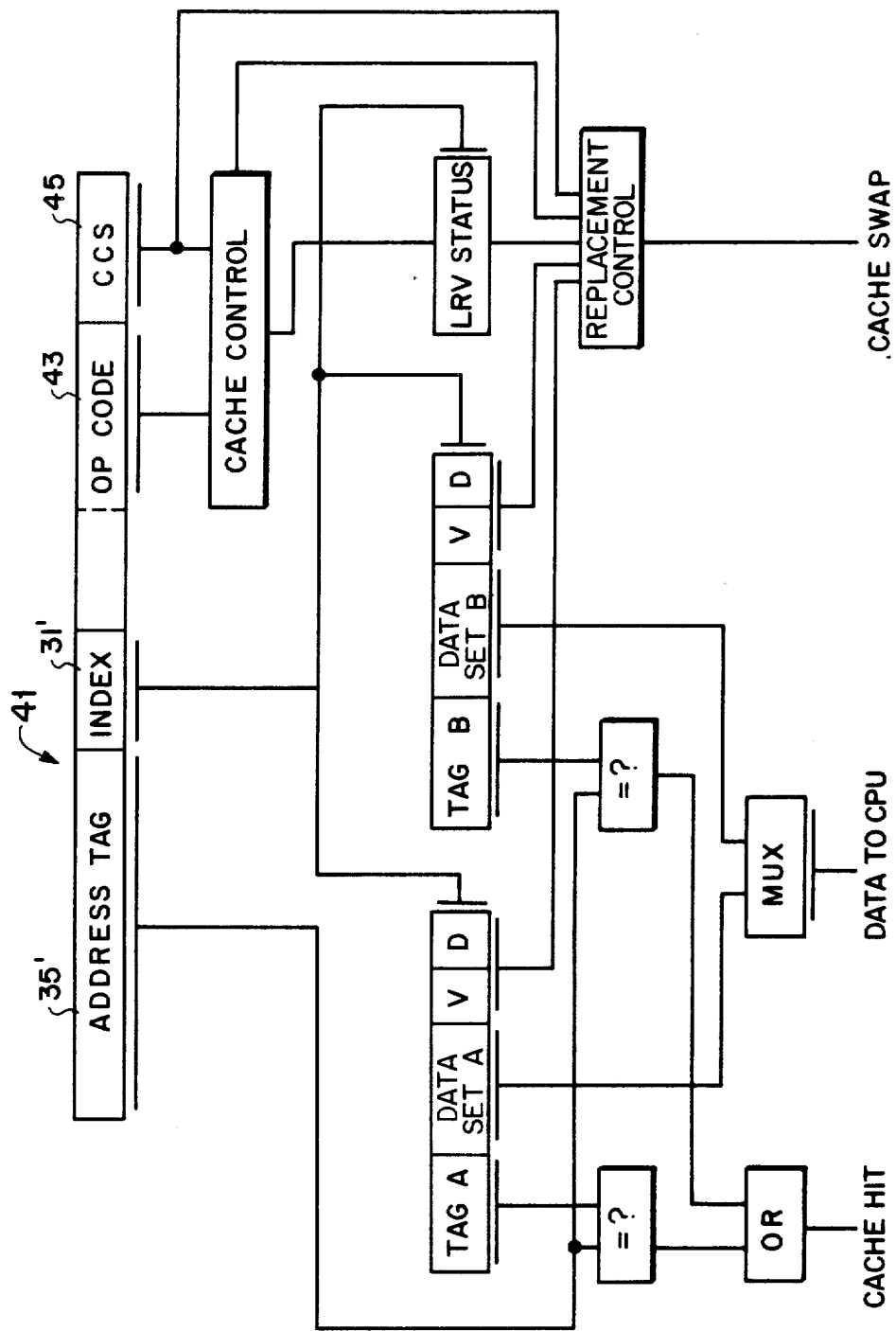
FIG. 3 is a schematic block diagram illustrating the operation of a two-set cache in accordance with the method of the present invention.

According to the present invention, as shown in FIG. 3, the instruction executed by processor 19, which gives rise to the data request the cache 21 must handle, includes a number of bits which comprise a cache control specifier. The cache control specifier is coded to inform the cache about the type of data referenced by the instruction and, thus, which one of a plurality of replacement schemes should be used to swap data out of cache 21.

The instruction 41 provided by the processor 19 includes information from which may be computed an address tag 35' (which is used for searching the cache 21 for a corresponding tag 35), and index 31' (which is used to identify the desired index 31 in cache 21), an operational code field 43 (which is used to control the operation at the cache 21), and a cache control specifier 45 which specifies the method to be used in swapping data from the cache.

In the preferred embodiment of the invention, the instruction can code four such cache specifiers: NORMAL data, STACK data, SEQUENTIAL data and PREFETCH. The cache responds to these specifiers to choose the replacement scheme which is best suited to the type of data identified.

For NORMAL data, a NORMAL cache control specifier is used and the cache operates according to the standard replacement scheme, in this case, LRU. Other standard replacement schemes that could be used are First-In-First-Out (FIFO) and random replacement.

Figure 4:
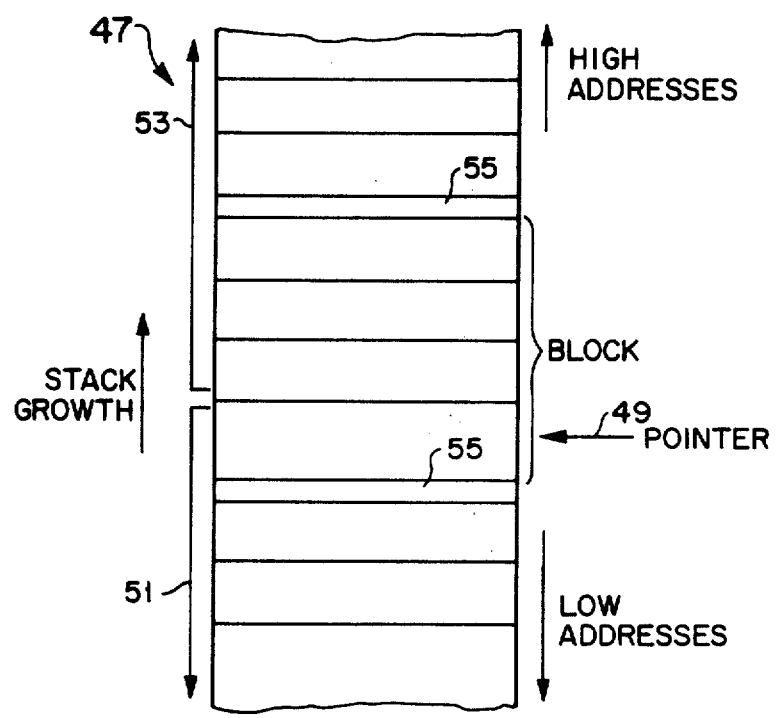
FIG. 4 is a schematic illustration of a stacked data structure which can be utilized in conjunction with the method of the present invention.

A STACK cache control specifier is used for stacked data structures that grow from low numbered addresses in memory. An example is the Last-in-First-Out (LIFO) stack structure 47 illustrated in FIG. 4. As shown in FIG. 4, a stack pointer 49 keeps track of the address of the top of the stack. The data at addresses below pointer 49, in the area 51, is valid data; data at addresses above pointer 49, in area 53, is invalid. The processor 19 is allowed to access any data currently considered valid, i.e., below stack pointer 49. The addresses in the stack 47 are mapped onto the indexed locations 31 in cache 21, and can be divided into blocks corresponding to the blocks in cache 21, as indicated by the double line divisions 55 shown in FIG. 4.

If the reference to the stack 47 is a STORE to the first word in a block and there is a cache "miss", then a new block must be allocated on the stack and in the cache. It is assumed that new data will be written into the selected block before the old data is read. Therefore, there is no need, in this case, to retrieve data from main memory. The cache initializes the address tag marks the block most recently used and performs the STORE. In addition, to prevent possible security violations, the block is initialized with constant or random data before performing the store.

If the reference to the stack 40 is a LOAD to the first word in a block, then room is being deallocated on the stack and it is assumed that the data in the block is no longer needed. The cache 21, therefore, performs a normal LOAD and marks the block clean and most eligible for replacement, i.e., least recently used.

Using the STACK variation of the standard replacement scheme avoids transferring invalid stack data into the cache and, thus, saves not only the time required to transfer the data to the cache in the first place, but also the time required to remove it from the cache and initialize the addresses later on.

The SEQUENTIAL cache control specifier is used for sequential data access patterns such as those involved in block move or in scanning text. When a LOAD or a STORE operation references the last address in a block, it is assumed that it will be the last reference to that block for a long time. Therefore, the cache performs the normal LOAD or STORE and the block is marked most eligible for replacement. If a STORE accesses the first word in a block and there is a cache "miss", it can be assumed that the whole block will be overwritten and there is no need to read from main memory 13. Instead a block is freed up in the cache, initialized for security and marked most recently used, valid and dirty (similar to STACK store). The operating system must make sure that no other data shares the last block of the sequential data structure or this procedure can result in the loss of that data.

The PREFETCH cache control specifier is used to indicate that, in a LOAD or STORE to a first block, the next block, that is the block immediately following the first block in main memory 13, is very likely to be accessed in the near future. The cache therefore performs a normal LOAD or STORE and fetches the next block if it is not already in the cache. Depending on how the cache is designed, the prefetch might occur when addresses are being accessed near the beginning, middle or end of the first block.

We claim:

1. A method for selecting for replacement data blocks in a cache memory of a computer system at a time when a new data block is retrieved from a main memory of the computing system wherein the computer system comprises a processor for fetching and executing data, the main memory, and the cache memory, the method comprising:

presenting an instruction from the processor to the cache memory, said instruction including a cache control specifier indicative of a type of data structure included in the cache memory;

selecting one of a plurality of replacement schemes for swapping a data block from cache memory, said selected replacement scheme being selected based on a value of said cache control specifier; and swapping a data block from cache memory in accordance with said selected replacement scheme when a new data block is retrieved from the main memory of the computing system.

2. A method as in claim 1 wherein said cache control specifier indicates that a standard replacement scheme is to be used.

3. A method as in claim 2 wherein said standard replacement scheme is LRU.

4. A method as in claim 1 wherein said cache control specifier is indicative of a stacked data structure.

5. A method as in claim 1 wherein said cache control specifier is indicative of a sequential data structure.

6. A method as in claim 1 wherein said cache control specifier indicates that a data block should be prefetched from main memory.

7. A method for selecting for replacement a cache data block in a cache memory of a computer system at a time when a new data block is retrieved from a main memory of the computing system wherein the computer system comprises a processor for fetching and executing data, the main memory, and the cache memory, the cache data block being part of a stacked data structure and including a plurality of serially arranged words, the method comprising:

searching the cache to determine whether a desired data block referenced by an instruction is contained in the cache;

when said instruction references a STORE to a first word in said desired data block and said desired block is not contained in the cache, allocating a new cache data block in the cache, marking the new cache data block as least eligible for replacement, and performing the STORE to said new cache data block without fetching any part of the desired data block from a main memory;

when said instruction references a STORE to a word other than the first word in said desired data block and said desired data block is not contained in the cache, fetching the desired data block from main memory;

when said instruction references a LOAD from the first word in said desired data block, marking said desired data block as most eligible for replacement and performing the LOAD from said desired data block; and, swapping the data block marked most eligible for replacement from the cache memory when the new data block is retrieved from the main memory of the computer system.

8. A method for selecting for replacement a cache data block in a cache memory of a computer system at a time when a new data block is retrieved from a main memory of the computing system wherein the computer system comprises a processor for fetching and executing data, the main memory, and the cache memory, the cache memory block being part of a sequential data structure, and including a plurality of serially arranged words, the method comprising:

presenting an instruction from the processor to the cache memory, said instruction including a cache control specifier indicating that access to a desired data block from a sequential data structure is desired;

searching the cache to determine whether said desired data block is contained in the cache;

when said instruction references a last word in said desired data block, and said desired data block is contained in the cache, marking said desired data block most eligible for replacement;

when said instruction references a STORE to a first word in said desired data block and said desired data block is not contained in the cache, allocating a new cache data block in the cache, marking said new cache data block as least eligible for replacement, and performing the STORE to said new cache data block; and, swapping the data block marked most eligible for replacement from the cache memory when the new data block is retrieved from the main memory of the computing system.

* * * * *